United States Patent [19]
Anderson

[11] Patent Number: 5,146,613
[45] Date of Patent: Sep. 8, 1992

[54] LOW POWER UHF DATA TRANSCEIVER

[75] Inventor: Fred J. Anderson, Kokomo, Ind.

[73] Assignee: Delco Electronics Corporation, Kokomo, Ind.

[21] Appl. No.: 614,488

[22] Filed: Nov. 16, 1990

[51] Int. Cl.⁵ .............................................. H04B 1/44
[52] U.S. Cl. ................................. 455/78; 331/107 A
[58] Field of Search ............................... 455/78–83; 333/101, 103–105, 107 A; 340/539, 542

[56] References Cited

U.S. PATENT DOCUMENTS

| 4,749,964 | 6/1988 | Ash | 331/107 A |
| 4,823,098 | 4/1989 | DeMuro et al. | 455/78 |
| 4,885,799 | 12/1989 | Van Horn | 455/78 |
| 4,973,940 | 11/1990 | Sakai et al. | 455/78 |
| 4,982,442 | 1/1991 | Sarokhanian | 455/83 |

Primary Examiner—Curtis Kuntz
Attorney, Agent, or Firm—A. Frank Duke

[57] ABSTRACT

A transceiver has an RF oscillator stage shared by the receiving and transmitting modes. The RF oscillator has a feedback loop incorporating a SAW delay line. A switching arrangement selectively couples the antenna to the transmission circuit and optionally couples the antenna to the receiving circuit. The RF oscillator stage is isolated from switching perturbations by small capacitors at the input and at the output of the oscillator.

11 Claims, 2 Drawing Sheets

TRANSMIT MODE SIGNALS

5,146,613

LOW POWER UHF DATA TRANSCEIVER

FIELD OF THE INVENTION

This invention relates to a transceiver and particularly to a low power UHF data transceiver using a surface acoustic wave device.

BACKGROUND OF THE INVENTION

Data transceivers of the type used for remote access to vehicles require reliability, small size and low power consumption. A remote access system comprises a base unit in a vehicle and a remote unit to be carried by the operator. The base and remote units are coupled by a UHF radio link for a bi-directional exchange of data when activated to verify that the remote unit is authorized to command vehicle access. It is desired that the remote unit be small enough to be carried on a key chain and have a battery sufficient for several years operation. Accordingly a simple, low power consumption transceiver circuit is desired. It is further desired that the unit have high temperature stability.

The U.S. Pat. No. 4,749,964 to Ash entitled "Superregenerative Detector Having a SAW device in the Feedback Circuit", which is incorporated herein by reference, discloses a receiver having a simple circuit and including a surface acoustic wave (SAW) device in the feedback circuit of the RF oscillator. The detector includes a quenching oscillator coupled to the RF oscillator to turn the RF oscillator on and off at a given frequency and duty cycle, and an input RF signal is superimposed on the RF oscillator to modulate the oscillation by increasing the duty cycle. The modulation is recovered by low pass filtering the output of the oscillator. The same device is further described in the RF Monolithics applications note by Ash, "A Low Cost Superregenerative SAW Stabilized Receiver".

SUMMARY OF THE INVENTION

It is therefore an object of the invention to provide a transceiver having small size, low power consumption, and high temperature stability. A further object as to provide such a transceiver having an oscillator with a SAW device in its feedback loop which is shared by the receiver and transmitter modes.

The invention is carried out by a low power transmitter/receiver having a receiving mode and a transmitting mode comprising; an RF oscillator having an input and an output and a feedback circuit containing a surface acoustic wave device coupling the input and the output to cause RF oscillations, control means for switching between transmitting and receiving modes, transmission means coupled to said output and effective during transmitting mode for transmitting the RF oscillations, and input means effective during receiving mode for coupling a modulated RF signal to said oscillator input, and low pass filter means coupled to the oscillator output to recover the modulation.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The transceiver described herein was specifically designed for use with a remote vehicle access system using a short range radio link operating at a carrier frequency of 300 MHz. The invention is not limited to that particular application, however. Other short range radio link applications include toll booth billing, fleet management, and service information data transfer, for example.

Figure 1:
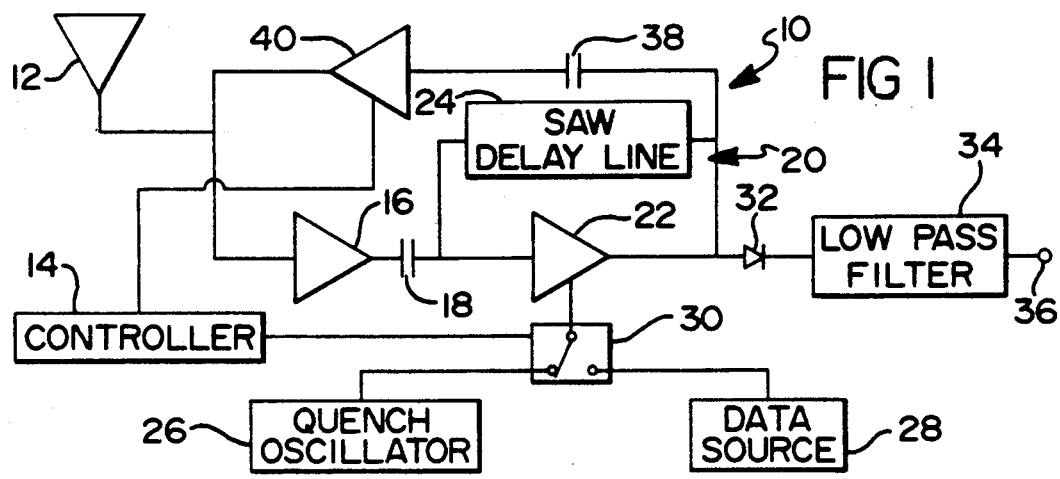
FIGS. 1 and 2 are schematic diagrams of first and second embodiments of a transceiver according to the invention.

FIG. 1 shows the transceiver 10 connected to an antenna 12 and having a controller 14 for switching between receiving and transmitting modes. The antenna is directly coupled to the input of an RF amplifier 16 which has an output coupled through a very small capacitor 18 to the input of an RF super-regenerator oscillator circuit 20. The oscillator 20 comprises an inverting amplifier 22 having an input and an output and a feedback loop comprising a SAW delay line 24 connected between the output and the input. The SAW device is selected to produce an oscillator frequency, on the order of 300 MHz, which is the same as the carrier frequency of the received signal.

The inverting amplifier 22 is selectively coupled to a quench oscillator 26 and a data source 28 by a switch 30 controlled by the controller 12 to controllably turn the RF oscillator 20 on and off. The quench oscillator operates at a quench frequency, on the order of 50 kHz, which turns the RF oscillator on and off at the same frequency when the switch 30 connects the quench oscillator to the amplifier 22. The output of the RF oscillator 20 is connected to a detector 32 to detect the RF envelope and a low pass filter 34 to strip the RF and the quench frequency from the signal to yield an output at a terminal 36. The output of the oscillator 20 is also coupled through a very small capacitor 38 to a transmit buffer 40 which has an output connected to the antenna 12. The data source 28, when connected to the inverting amplifier 22 by the switch 30, produces pulse width modulated voltage pulses corresponding to data to be transmitted and thus turns the oscillator 20 on and off in accordance with the voltage pulses to generate bursts of RF oscillation. The controller 14 is connected to the transmit buffer 40 to turn the buffer on only during the transmission mode.

The transceiver, by reason of its simplicity is inexpensive and has low power consumption. The RF oscillator 20 is shared by the receiving and transmitting modes. The RF amplifier 16, the inverting amplifier 22 and the transmit buffer 40 each require only one transistor. The SAW device (e.g., an RF Monolithics SL1012 SAW delay line) is a single phase delay line which provides the oscillator with a high temperature stability and a narrow bandwidth (typically a +/−250 kHz 3 dB bandwidth). The delay line oscillator's center frequency and matching characteristics are very sensitive to loading effects from peripheral circuitry. This is due to the high impedance nature of the super-regenerative circuit—a high impedance looking into the oscillator is desirable for high sensitivity to signals from the RF amplifier 16. Therefore coupling signals in and out of the oscillator during transmit and receive modes would be difficult if mode switching or signal gating is done at the oscillator itself. Minute changes in impedance around the oscillator can swing the center frequency many tens of kHz. The present circuit overcomes this problem by maintaining a constant impedance load to the oscillator by coupling lightly in and out of this stage and keeping the voltage biases of the RF amplifier 16 and the transmit buffer 40 constant for both transmit and receive modes. The coupling capacitors 18 and 38 are very small, on the order of 1 pf or less to assure minimal load changes on the oscillator.

Figure 2:
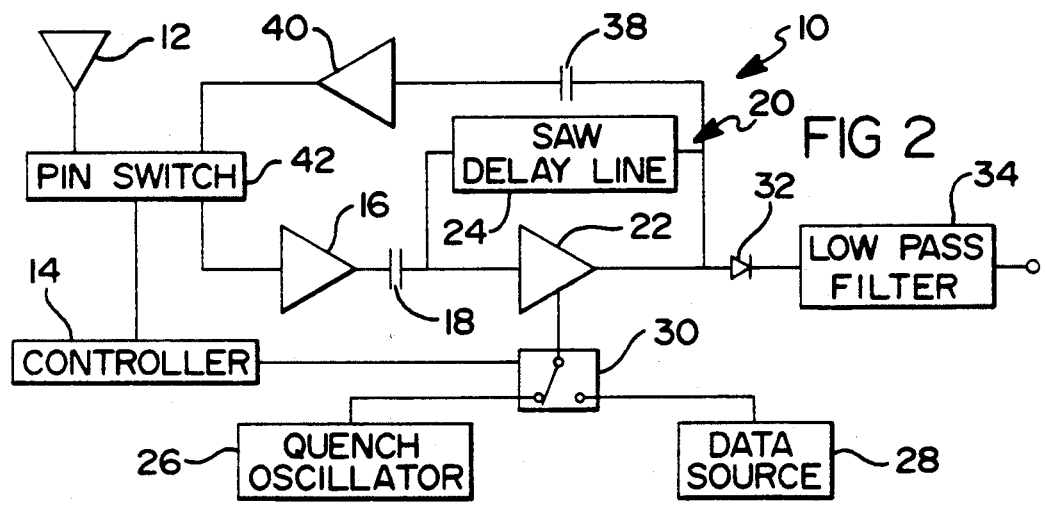

A variant of the circuit of FIG. 1 is shown in FIG. 2. Instead of switching the transmit buffer 40 on and off, a PIN switch 42 controlled by the controller 14 is used to selectively couple the transmit buffer 40 and the RF amplifier 16 to the antenna 12. In other respects the circuit is the same as that of FIG. 1. The advantage of the PIN switch is that it more surely prevents any transmission due to leakage of the transmit buffer 40 and is isolated from the RF oscillator 20 by the RF amplifier 16 and the transmit buffer 40 to prevent load changes on the oscillator due to switching. The disadvantage of the PIN switch is that it take more current to operate than the FIG. 1 circuit. Thus it is better suited for a base unit housed in a vehicle, for example, while the circuit without the PIN switch is preferred for a miniature remote unit operated by a battery. The circuits described below show the PIN switch but the discussion applies fully to both circuit versions.

Figure 3:
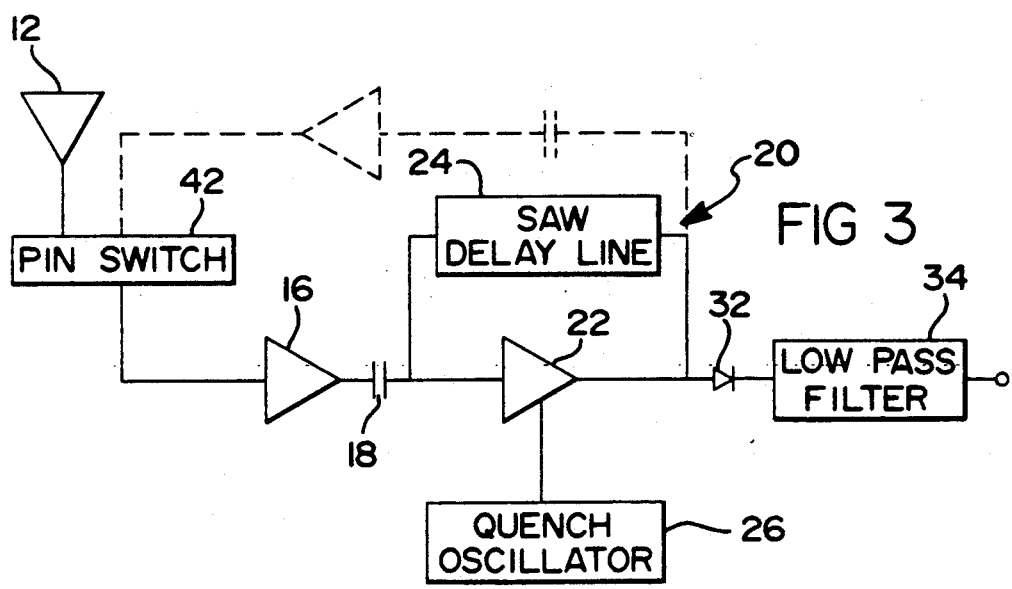
FIG. 3 is a schematic diagram of the circuit of FIG. 2 showing in solid lines the portion of the circuit used during the receive mode, FIG. 4, parts a-d, are waveforms occurring in various parts of the circuit of FIG. 3.
Figure 4:
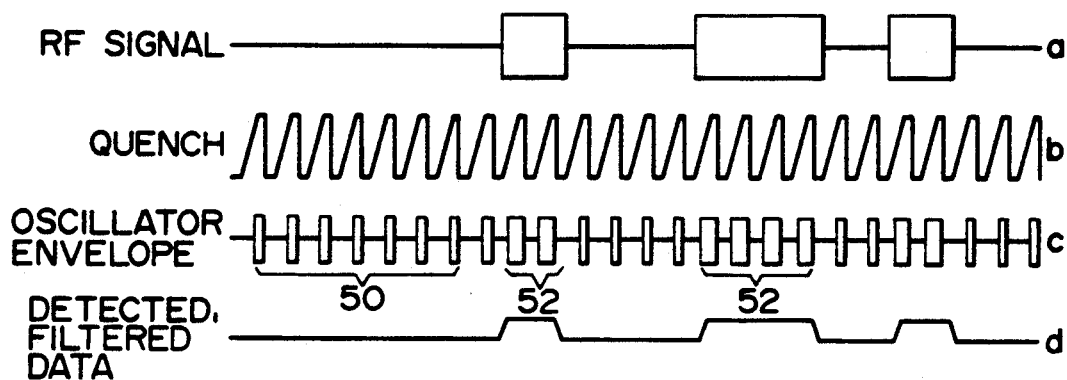

FIG. 3 illustrates in solid lines the portion of the circuit of FIG. 2 which is active during the receive mode. FIG. 4, parts a-d, illustrates signal waveforms developed in certain parts of the receiver circuit. In the receive mode, the system is a conventional super-regenerative configuration. Signals at the antenna are presented to the RF amplifier 16, which provides approximately 10 dB of gain and 20 dB of isolation (to suppress spurious radiation) to yield the signals of FIG. 4, part a. The inverting amplifier 22 and SAW delay line 24 form a regenerative oscillator at the frequency of the RF carrier. The oscillator is activated with a high-frequency periodic quench signal (nominally 50 kHz), shown at FIG. 4, part b, providing a constant duty cycle oscillator envelope, shown in region 50 of FIG. 4, part c. The quench signals have a ramped leading edge to turn on the RF oscillator 20 when a certain bias voltage is reached. Any RF signals coupled into the oscillator section from the RF amplifier 16 will increase the duty cycle of the envelope, shown in regions 52 of FIG. 4 part c, since RF energy at the oscillator frequency will cause the oscillator to turn on at a lower bias point (equivalent to a point earlier on the quench waveform). The changes in the oscillator envelope are detected and filtered by elements 32 and 34 to recover the modulation, providing a representation of the original transmitted signal as shown in part d of FIG. 4.

Figure 5:
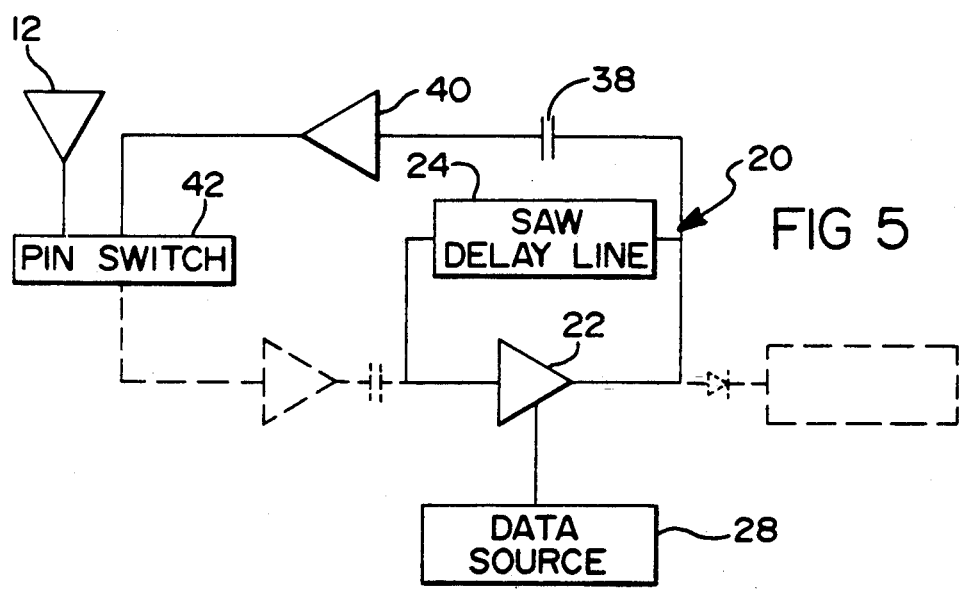
FIG. 5 is a schematic diagram of the circuit of FIG. 2 showing in solid lines the portion of the circuit used during the transmit mode, FIG. 6, parts a and b, are waveforms occurring in various parts of the circuit of FIG. 5.
Figure 6:
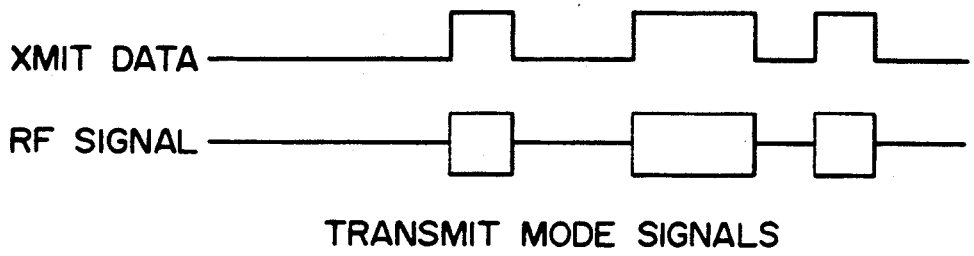

FIG. 5 shows in solid lines the active portion of the circuit of FIG. 2 during transmit mode. The data source 28 generates a transmit data signal, shown in FIG. 6, part a, which turns the RF oscillator 20 on and off to generate an RF signal comprising pulse width modulated RF bursts as shown in part b of FIG. 6. A small amount of the RF energy is coupled through the small capacitor 38 into the transmit buffer 40, which provides gain and matching to the antenna. The output level is also a function of the transmit buffer, and can be adjusted within the operating range of its transistor.

The embodiments of the invention in which an exclusive property or privilege is claimed are defined as follows:

1. A low power transmitter/receiver having a receiving mode and a transmitting mode comprising;
   RF oscillator means including an amplifier having an input and an output and further including a feedback circuit containing a surface acoustic wave device coupling said input and said output to cause RF oscillations,
   control means coupled to said transmitter/receiver for switching said transmitter/receiver between said transmitting and said receiving modes,
   transmission means coupled to said output and effective during said transmitting mode for transmitting the RF oscillations, and
   input means effective during said receiving mode for coupling a modulated RF signal to said oscillator input, and low pass filter means coupled to said output of said oscillator to recover the modulation.

2. The invention as defined in claim 1 including;
   data means coupled to the RF oscillator during transmitting mode for modulating the RF oscillations for transmission,
   a quench oscillator coupled to the RF oscillator during receiving mode for switching the RF oscillator between an oscillating and a non-oscillating condition.

3. The invention as defined in claim 1 including an antenna, and wherein the control means includes switch means connected to the antenna and to the transmission means and the input means for selectively coupling the transmission means and the input means to the antenna for transmitting mode and receiving mode respectively.

4. The invention as defined in claim 1 including an antenna, and wherein the control means includes means coupled to the transmission means for coupling the said RF oscillations to the antenna only during the transmitting mode.

5. The invention as defined in claim 2 wherein the control means includes means for coupling the data means to the RF oscillator during transmitting mode and for coupling the quench oscillator to the RF oscillator during the receiving mode.

6. The invention as defined in claim 1 including means for isolating the RF oscillator from the effects of switching external of the oscillator circuit comprising high impedance capacitive coupling between the RF oscillator output and the transmission means.

7. The invention as defined in claim 1 including means for isolating the RF oscillator from the effects of switching external of the oscillator circuit comprising high impedance capacitive coupling between the RF oscillator input and the input means.

8. The invention as defined in claim 1 including means operable during transmission mode for coupling a data signal to the RF oscillator to modulate the oscillator output for transmission.

9. A low power data transceiver comprising;
   an antenna,
   a transmission buffer,
   an RF amplifier
   an RF oscillator having an input and an output and a feedback circuit containing a surface acoustic wave device coupling the input and the output to cause RF oscillations, means for coupling the oscillator output to the transmission buffer to produce a signal for transmission, switch means connected to the transmission buffer for coupling transmit signals to the antenna during transmission mode, means effective during receiving mode for switching the oscillator between an oscillating and an non-oscillating condition, means for coupling the RF amplifier to the oscillator input to modulate the oscillator, and a low pass filter means coupled to said output of said oscillator for detecting oscillation modulation caused by input signals.

10. The invention as defined in claim 9 wherein the switch means is also connected to the antenna and the RF amplifier for coupling the antenna to the RF amplifier during receiving mode to pass input signals to the RF amplifier.

11. The invention as defined in claim 9 wherein each of said means for coupling comprises a high impedance coupling to minimize the effect of said switch means on the RF oscillator.

* * * * *